United States Patent
Suthar et al.

(12)
(10) Patent No.: US 6,225,370 B1
(45) Date of Patent: May 1, 2001

(54) INK COMPOSITIONS

(75) Inventors: Ajay Kanubhai Suthar; Bradley Leonard Beach, both of Lexington; Kathryn Dowlen Mullins, Frankfort; Jing X. Sun; Robin Gnerlich Baskette, both of Lexington, all of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/360,500

(22) Filed: Jul. 26, 1999

(51) Int. Cl.$^7$ .................... C09D 11/10; C08L 33/02; C08L 33/08; C08L 33/10; C08L 83/06; C08F 2/38

(52) U.S. Cl. .................... 523/160; 524/556; 524/588; 525/479; 526/224

(58) Field of Search ..................... 523/160, 161; 106/31.6; 526/224; 525/479; 528/23, 33; 524/556, 588

(56) References Cited

U.S. PATENT DOCUMENTS

| | | |
|---|---|---|
| 3,859,388 | 1/1975 | Hill, Jr. et al. . |
| 3,960,824 * | 6/1976 | Hicks ........................ 526/85 |
| 4,139,514 * | 2/1979 | Bassett ...................... 524/824 |
| 4,388,115 * | 6/1983 | Sugiyama et al. .......... 524/105 |
| 5,085,698 | 2/1992 | Ma et al. . |
| 5,101,217 | 3/1992 | Iwata et al. . |
| 5,180,425 * | 1/1993 | Matrick et al. ............ 106/31.58 |
| 5,221,334 | 6/1993 | Ma et al. . |
| 5,302,197 * | 4/1994 | Wickramanayake et al. .... 106/31.76 |
| 5,362,603 | 11/1994 | Katoh et al. . |
| 5,431,720 | 7/1995 | Nagai et al. . |
| 5,529,616 * | 6/1996 | Prasad ........................ 524/389 |
| 5,656,071 * | 8/1997 | Kappele et al. ............ 106/31.76 |
| 5,714,538 | 2/1998 | Beach et al. . |
| 5,719,204 | 2/1998 | Beach et al. . |
| 5,782,968 | 7/1998 | Hirayama et al. . |
| 5,810,915 | 9/1998 | Nagai et al. . |
| 5,879,439 | 3/1999 | Nagai et al. . |
| 5,882,389 | 3/1999 | Schwarz, Jr. . |
| 5,882,390 | 3/1999 | Nagai et al. . |
| 5,883,157 | 3/1999 | Yamashita et al. . |
| 5,925,692 * | 7/1999 | Kappele et al. ............ 523/160 |
| 5,948,833 * | 9/1999 | Jilek et al. ................. 523/172 |
| 5,994,427 * | 11/1999 | Kappele et al. ............ 523/160 |
| 6,022,403 * | 2/2000 | Kuo ........................... 106/31.86 |
| 6,056,811 * | 2/2000 | Shimomura et al. ......... 106/31.36 |

* cited by examiner

Primary Examiner—Vasu Jagannathan
Assistant Examiner—Callie E. Shosho
(74) Attorney, Agent, or Firm—Jacqueline M. Daspit; Geoffrey L. Oberhaus; Jackie A. Zurcher

(57) ABSTRACT

An ink composition comprises a colorant and an additive. The additive is selected from the group consisting of first dispersants synthesized from an aromatic mercaptan, a hydrophilic monomer, a hydrophobic polymeric reactant having a siloxyl substituent and a first stabilizing reactant; second dispersants synthesized from a non-aromatic mercaptan, a hydrophilic monomer, a hydrophobic polymeric reactant having a siloxyl substituent, and a second stabilizing reactant selected from the group consisting of nonylphenoxy $(PEG)_{4-6}$ methacrylate, nonylphenoxy $(PPG)_{4-6}$ methacrylate, nonylphenoxy $(PEG)_{4-6}$ acrylate, nonylphenoxy $(PPG)_{4-6}$ acrylate and mixtures thereof; humectant mixtures comprising a bis-hydroxy terminated thioether, a lactam, and a compound selected from the group consisting of polyalkylene glycols, polyol/alkylene oxide condensates and mixtures thereof; and mixtures thereof.

50 Claims, No Drawings

INK COMPOSITIONS

TECHNICAL FIELD

This invention relates to ink compositions comprising a colorant and an additive. Additives include polymeric dispersants comprising a thio-aromatic group and/or a stabilizing segment selected from the group consisting of nonylphenoxy $(PEG)_{4-6}$ methacrylate, nonylphenoxy $(PPG)_{4-6}$ methacrylate, nonylphenoxy $(PEG)_{4-6}$ acrylate, nonylphenoxy $(PPG)_{4-6}$ acrylate and mixtures thereof, and humectant mixtures comprising a bis-hydroxy terminated thioether, a lactam and a compound selected from the group consisting of polyalkylene glycols, polyol/alkylene oxide condensates and mixtures thereof. The additives may comprise mixtures of dispersants and humectant mixtures.

BACKGROUND ART

Ink compositions for use in ink jet printers generally comprise deionized water, a water soluble or water miscible organic solvent, and a colorant. Frequently, the colorant is a soluble dye. Unfortunately, inks comprising soluble dyes can exhibit many problems, such as poor water-fastness, poor light-fastness, clogging of the jetting channels as a result of solvent evaporation and changes in the dye's solubility, dye crystallization, ink bleeding and feathering on the printed page, poor thermal stability, chemical instability and ease of oxidation. Many of these problems can be minimized by replacing the soluble dyes used in ink formulations with insoluble pigments. In general, pigments have superior properties when compared to dyes, including good water-fastness, good light-fastness, thermal stability, oxidative stability and compatibility with both coated/treated and plain papers.

In pigmented ink compositions, the insoluble pigment is generally stabilized in a dispersion by a polymeric component. Generally speaking, most pigment inks stabilized by polymers in aqueous media are based on an electrostatic stabilizing mechanism in which a hydrophobic group in the dispersant acts as an anchor adsorbed on the pigment particle surface through acid-base relation, electron donor/acceptor relation, Van der Waals forces, or physical adsorption. In this type of system, a hydrophilic group in the dispersant is extended into the aqueous medium to keep the dispersant soluble and to set up an electrosteric layer to prevent aggregation of the particles. This results in a competition in the dispersing process between the pigment particle and the polymer, the polymer and the solvent, and the pigment particle and the solvent.

In order to form a stable polymeric dispersion, several factors need to be considered. First, the polymer must be firmly anchored to the pigment particle surface to withstand shear force and the competition of other ingredients. This requires a careful match of the polarity of the pigment particle surface and the hydrophobic group in the dispersant. Second, there is a need to adjust the identity, length and weight of the hydrophobic group in the dispersant to fully cover the pigment particle, otherwise, the adsorbed polymer will act as a flocculent. Third, an electrosteric layer with requisite thickness around the particle to repulse aggregation is needed.

It is common to add solvents, surfactants, defoamers, biocides and other additives to pigmented ink to optimize its print quality, dry time and maintenance characteristics. These additives may compete with the anchor group in the dispersant to adsorb on the pigment particle surface, and may also lower the solubility of the polymer in the media, especially at higher temperatures, thereby destabilizing the dispersion system. Destabilization of pigment dispersions in inks can result in flocculation of the pigment in the nozzle of the ink jet printer which can adversely impact the printing process. Most prior art pigment dispersions will clog the nozzle of ink jet printers when left standing in the atmosphere for an extended period of time (e.g., about 6 hours). The result of these interrelated and competing forces is that it has been extremely difficult to formulate pigmented ink jet inks which simultaneously exhibit excellent stability, water-fastness and excellent print density yet exhibit minimal print head nozzle clogging.

Attempts have been made to minimize print head nozzle clogging by formulating inks with hygroscopic materials (humectants) to keep inks moist in print cartridge nozzles. High quantities of humectants keep nozzles clog-free and minimize print head nozzle clogging. Unfortunately, high quantities of humectants adversely affects ink in terms of viscosity, dry time and smudging. Therefore, there is a need for ink comprising humectant combinations which decrease dry time and smudging while keeping print head nozzle substantially free of clogs.

Wickramanayke et al., U.S. Pat. No 5,302,197, disclose ink compositions comprising pigment dispersion, aqueous carrier medium and a cosolvent mixture comprising a polyol/alkylene oxide condensate and a cyclic amide derivative.

Nagai et al., U.S. Pat. Nos. 5,810,915, 5,879,439 and 5,882,390, disclose ink compositions which may comprise water-soluble organic solvents such as polyhydric alcohols, alkyl and aryl ethers derived from polyhydric alcohols, nitrogen-containing heterocyclic compounds, amides, amines and sulfur-containing solvents.

Yamashita et al., U.S. Pat. No. 5,883,157, disclose the use of water-soluble organic solvents to prevent evaporation of water in ink for ink jet recording. Suitable solvents include polyhydric alcohols, glycol ethers, solvents containing sulfur and solvents containing nitrogen.

Schwarz, Jr., U.S. Pat. No. 5,882,389, discloses ink compositions comprising water, colorant and an oxazolidonone compound.

Hill, Jr. et al., U.S. Pat. No. 3,859,388, disclose aralkyl mercaptans as effective polymerization molecular weight modifiers for the preparation of nitryl polymers.

Beach et al., U.S. Pat. Nos. 5,714,538 and 5,719,204, disclose ink dispersants which are graft copolymers comprising a hydrophilic polymeric segment, a hydrophobic polymeric segment incorporating a hydrolytically-stable siloxyl substituent, and a stabilizing segment, such as a reactive surfactant macromer, a protective colloid macromer, or a non-siloxyl hydrophobic monomer. Beach et al. disclose the graft copolymers are synthesized using chain transfer agents such as $C_4$–$C_{18}$ alkylthiols, and exemplify a polymeric dispersant synthesized using dodecanethiol.

Hirayama et al., U.S. Pat. No. 5,782,968, disclose a method of producing a black pigment comprising the step of contacting a polymer with a carbon material at a temperature of 50° C. to 250° C. Hirayama et al. disclose the polymer may be synthesized using a photopolymerization initiator, a hexaaryl-bisimidazole compound or a hydrogen donor, such as an aromatic mercaptan compound or an aromatic amine compound.

Ma et al., U.S. Pat. Nos. 5,221,334 and 5,085,698, disclose particles of pigment stabilized in a block copolymer comprising a hydrophobic segment and a hydrophilic segment. Ma et al. further disclose that the hydrophobic segment is a hydrophobic homopolymer or copolymer of an acrylic monomer, and that the hydrophilic segment is a hydrophilic polymer or salt thereof of an acrylic monomer or a copolymer of an acrylic monomer.

There is a need for ink compositions with decreased dry time and dry smudging. Such compositions generally require improved humectant mixtures and/or lower levels of humectant. There is also a need for dispersants which can stabilize pigments in ink compositions which comprise lower levels of humectants.

SUMMARY OF THE INVENTION

Accordingly, it is an object of this invention to obviate various problems of the prior art.

It is another object of this invention to provide novel methods for improving the dry time of ink compositions.

It is yet another object of this invention to provide novel methods to decrease the amount of dry smudging exhibited by an ink composition while at the same time minimizing print head nozzle clogging.

It is a further object of this invention to provide novel dispersants which have improved adsorption onto pigment surfaces.

It is yet another object of this invention to provide novel dispersants which form stable pigment dispersions in ink compositions having low total humectant levels.

In accordance with one aspect of the invention, ink compositions comprise a colorant and an additive selected from the group consisting of first dispersants synthesized from an aromatic mercaptan, a hydrophilic monomer, a hydrophobic polymeric reactant having a siloxyl substituent and a first stabilizing reactant; second dispersants synthesized from a non-aromatic mercaptan, the hydrophilic monomer, the hydrophobic polymeric reactant having a siloxyl substituent and a second stabilizing reactant selected from the group consisting of nonylphenoxy $(PEG)_{4-6}$ methacrylate, nonylphenoxy $(PPG)_{4-6}$ methacrylate, nonylphenoxy $(PEG)_{4-6}$ acrylate, nonylphenoxy $(PPG)_{4-6}$ acrylate and mixtures thereof; humectant mixtures comprising a bis-hydroxy terminated thioether, a lactam, and a compound selected from the group consisting of polyalkylene glycols, polyol/alkylene oxide condensates and mixtures thereof; and mixtures thereof.

In accordance with another aspect of the invention, ink compositions comprise a pigment and an additive selected from the group consisting of first dispersants comprising a thio-aromatic group, a hydrophilic polymeric segment, a hydrophobic polymeric segment and a first stabilizing segment; second dispersants comprising a thio-alkyl group, the hydrophilic polymeric segment, the hydrophobic polymeric segment and a second stabilizing segment selected from the group consisting of nonylphenoxy $(PEG)_{4-6}$ methacrylate, nonylphenoxy $(PPG)_{4-6}$ methacrylate, nonylphenoxy $(PEG)_{4-6}$ acrylate, nonylphenoxy $(PPG)_{4-6}$ acrylate and mixtures thereof, humectant mixtures comprising a bis-hydroxy terminated thioether, a lactam, and a compound selected from the group consisting of polyalkylene glycols, polyol/alkylene oxide condensates and mixtures thereof; and mixtures thereof.

In accordance with another aspect of the invention, methods of forming an ink comprise synthesizing a dispersant from an aromatic mercaptan, a hydrophilic monomer, a hydrophobic polymeric reactant and a stabilizing reactant; combining the dispersant with pigment to form dispersion particles; and mixing the dispersion particles and a humectant mixture comprising a bis-hydroxy terminated thioether, a lactam, and a compound selected from the group consisting of polyalkylene glycols, polyol/alkylene oxide condensates and mixtures thereof.

In accordance with yet another aspect of the invention, methods of reducing smudging of pigment-based ink compositions comprise formulating the ink composition with a dispersant and a humectant mixture. The dispersant is selected from the group consisting of first dispersants synthesized from an aromatic mercaptan, a hydrophilic monomer, a hydrophobic polymeric reactant having a siloxyl substituent, and a first stabilizing reactant; second dispersants synthesized from a non-aromatic mercaptan, the hydrophilic monomer, the hydrophobic polymeric reactant having a siloxyl substituent, and a second stabilizing reactant selected from the group consisting of nonylphenoxy $(PEG)_{4-6}$ methacrylate, nonylphenoxy $(PPG)_{4-6}$ methacrylate, nonylphenoxy $(PEG)_{4-6}$ acrylate, nonylphenoxy $(PPG)_{4-6}$ acrylate and mixtures thereof; and mixtures thereof. The humectant mixture comprises a bis-hydroxy terminated thioether, a lactam, and a compound selected from the group consisting of polyalkylene glycols, polyol/alkylene oxide condensates and mixtures thereof.

In accordance with another aspect of the invention, methods of decreasing dry time of pigment-based ink compositions comprise formulating the ink composition with a dispersant and a humectant mixture. The dispersant comprises a moiety selected from the group consisting of thio-aromatic groups, nonylphenoxy $(PEG)_{4-6}$ methacrylate, nonylphenoxy $(PPG)_{4-6}$ methacrylate, nonylphenoxy $(PEG)_{4-6}$ acrylate, nonylphenoxy $(PPG)_{4-6}$ acrylate and mixtures thereof; and the humectant mixture comprises a bis-hydroxy terminated thioether, a lactam, and a compound selected from the group consisting of polyalkylene glycols, polyol/alkylene oxide condensates and mixtures thereof.

In accordance with another aspect of the invention, copolymers comprise: (a) a hydrophilic polymeric segment, which preferably incorporates a carboxyl substituent; (b) a hydrophobic polymeric segment, which preferably has a molecular weight of from about 200 to about 3,000, and which preferably incorporates a hydrolytically stable siloxyl substituent; and (c) a stabilizing segment selected from the group consisting of nonylphenoxy $(PEG)_{4-6}$ methacrylate, nonylphenoxy $(PPG)_{4-6}$ methacrylate, nonylphenoxy $(PEG)_{4-6}$ acrylate, nonylphenoxy $(PPG)_{4-6}$ acrylate and mixtures thereof.

It is has been found that ink formulated with a defined polymeric dispersant and/or a defined humectant mixture show good performance characteristics. More specifically, the inks formulated in accordance with the present invention demonstrate reduced dry time, reduced dry smudging, and/or improved dispersant stability.

These and additional objects and advantages will become more fully apparent in view of the following description.

DETAILED DESCRIPTION OF THE INVENTION

Ink compositions of the present invention comprise a colorant, preferably a pigment, and an additive. Additives include dispersants comprising a thio-aromatic group and/or a stabilizing segment selected from the group consisting of nonylphenoxy $(PEG)_{4-6}$ methacrylate, nonylphenoxy $(PPG)_{4-6}$ methacrylate, nonylphenoxy $(PEG)_{4-6}$ acrylate, nonylphenoxy $(PPG)_{4-6}$ acrylate and mixtures thereof; and humectant mixtures comprising a bis-hydroxy terminated thioether, a lactam and a compound selected from the group consisting of polyalkylene glycols, polyol/alkylene oxide condensates and mixtures thereof. The additives may comprise mixtures of such dispersants and humectant mixtures.

Preferred dispersants are selected from the group consisting of dispersants comprising a thio-aromatic group, a hydrophilic polymeric segment, a hydrophobic polymeric segment and a stabilizing segment; dispersants comprising a thio-alkyl group, a hydrophilic polymeric segment, a hydrophobic polymeric segment and a stabilizing segment selected from the group consisting of nonylphenoxy (PEG)$_{4-6}$ methacrylate, nonylphenoxy (PPG)$_{4-6}$ methacrylate, nonylphenoxy (PEG)$_{4-6}$ acrylate, nonylphenoxy (PPG)$_{4-6}$ acrylate and mixtures thereof, and mixtures thereof.

Polymeric Dispersants

Polymer dispersants stabilize pigment dispersions in aqueous ink compositions. The polymers provide for inks having good water-fastness and excellent print quality and optical density characteristics. Graft copolymers which are useful dispersants in ink jet ink compositions comprise:

(a) a hydrophilic polymeric segment, which preferably incorporates a carboxyl substituent;

(b) a hydrophobic polymeric segment, which preferably has a molecular weight of from about 200 to about 3,000, and which preferably incorporates a hydrolytically stable siloxyl substituent; and (c) a stabilizing segment which preferably has a molecular weight of from about 200 to about 2,000, and which is preferably selected from the group consisting of reactive surfactant macromers, protective colloid macromers and non-siloxyl hydrophobic monomers. Dispersant polymers including a hydrophilic polymeric segment, a hydrophobic polymeric segment and a stabilizing segment are described in Beach et al., U.S. Pat. Nos. 5,714,538 and 5,719,204, incorporated herein by reference.

Generally, during the polymerization process, chain transfer groups are often employed to control the molecular weight of the polymer and to terminate the reaction. The inventors have discovered that the use of aromatic mercaptans as chain transfer agents provides improved dispersant polymers. While not being bound by theory, it is believed that in the polymerization termination, the polymeric free radical extracts the hydrogen from the thiol group of the mercaptan. A bond is formed between the polymeric free radical and the sulfur, providing the polymer with an aromatic group attached by a sulfur link, referred to herein as a "thio-aromatic group". In some instances, the aromatic mercaptans may further serve as polymerization initiators.

Thus, the use of aromatic mercaptans as chain transfer agents or initiators provides a way to prepare dispersants comprising a hydrophilic polymeric segment, a hydrophobic polymeric segment, a stabilizing segment and a thio-aromatic group. Such dispersants are synthesized using hydrophilic monomers, hydrophobic polymeric reactants, stabilizing reactants and aromatic mercaptans.

The inventors have also discovered that the use of certain preferred stabilizing segments, particularly nonylphenoxy (PEG)$_{4-6}$ methacrylate, nonylphenoxy (PPG)$_{4-6}$ methacrylate, nonylphenoxy (PEG)$_{4-6}$ acrylate, nonylphenoxy (PPG)$_{4-6}$ acrylate and mixtures thereof, improves dispersant activity. Dispersants comprising the preferred stabilizing segments may be synthesized with aromatic or non-aromatic mercaptans. Non-aromatic mercaptans include alkyl mercaptans, such as $C_4$–$C_{18}$ alkylthiols. A preferred alkyl mercaptan is dodecanethiol. The use of alkyl mercaptans as chain transfer agents or initiators provides a way to prepare dispersants comprising a hydrophilic polymeric segment, a hydrophobic polymeric segment, a stabilizing segment and a thio-alkyl group. As used herein, "thio-alkyl group" refers to an alkyl group attached by a sulfur link.

All percentages and ratios used herein are "by weight" unless otherwise specified. As used herein, "hydrophilic monomers" refer to compounds used to synthesize the hydrophilic polymeric segment.

The hydrophilic portion of the polymer is believed to help control polymer solubility in the ink composition. Generally, the hydrophilic polymeric segment will include acidic functional groups, such as carboxylic or sulfonic acid groups. Suitable hydrophilic polymers will be known to those skilled in the art. Preferred hydrophilic segments contain carboxyl substituents. Suitable hydrophilic segments are selected from the group consisting of acrylic polymers, acrylic copolymers, methacrylic polymers, methacrylic copolymer and mixtures thereof. When the hydrophilic segment comprises an acrylic or methacrylic copolymer, the additional monomer, i. e. the monomer other than the acrylic or methacrylic monomer, preferably does not interfere with the hydrophilic character of the segment. Suitable additional monomers include maleic acid, maleic anhydride, vinyl sulfate, and stryene sulfonic acid.

The hydrophilic polymeric segment comprises from about 20% to about 80%, preferably from about 30% to about 65%, by weight, of the entire polymeric dispersant. The hydrophilic polymeric segment must be long enough such that it acts to provide a stabilizing function to the dispersant.

Monomers which may be used to form the hydrophilic polymeric segment include methacrylic acid, acrylic acid, dimethylaminoethyl methacrylate, diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, dimethylacrylamide, ethylene glycol methacrylate phosphate, 2-(methacryloyloxy)ethyl phthalate, 2-(methacryloyloxy)ethyl succinate, 3-sulfopropyl methacrylate and 3-sulfopropyl acrylate. Protected monomers that generate acrylic or methacrylic acid after removal of the protecting group may also be used. Suitable protected monomers include trimethylsilyl methacrylate, trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, 2-tetrahydropyranyl methacrylate, t-butyl methacrylate, t-butyl acrylate and methyl oxymethacrylate. Preferred monomers are methacrylic acid, acrylic acid, t-butyl methacrylate, t-butyl acrylate, and mixtures thereof.

The hydrophobic polymeric reactant which forms the hydrophobic polymeric segment of the dispersant preferably comprises a polymer or copolymer, preferably a polymer or copolymer containing a hydrolytically stable linear or branched siloxyl substituent. This segment is believed to function as the anchor to adsorb the dispersant onto the pigment particle surface. A siloxyl substituent (an oligomeric siloxane) has the formula:

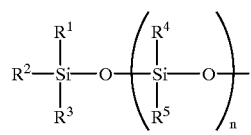

wherein n is from about 1 to about 50, preferably from about 2 to about 16, $R^1$ to $R^5$ are each independently an alkyl or aryl, preferably a lower alkyl ($C_1$–$C_{14}$ alkyl), phenyl or benzyl, and may optionally be substituted with a variety of non-interfering substituents. For branched siloxy substituents, $R^4$ and/or $R^5$ are siloxyl substituents. Preferably the siloxyl substituent will be terminated with a lower alkyl group. Preferably $R^1$ and $R^3$–$R^5$ are methyl, i.e., the siloxyl substituent is a dimethyl polysiloxane, and preferably $R^2$ is butyl. Acryloyl or methacryloyl-terminated polydialkylsiloxane macromers are preferred hydrophobic polymeric segments. The siloxyl substituent is hydrolytically stable in that it does not react with water under neutral conditions.

A preferred linear or branched substituent has the formula:

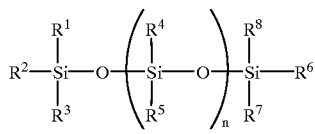

wherein n is from about 2 to about 16, and each of $R^1$–$R^8$ is independently benzyl, siloxyl, or lower alkyl. The lower alkyl preferably is a $C_1$–$C_6$, more preferably a $C_1$–$C_4$, alkyl. In one preferred embodiment, $R^1$ and $R^3$–$R^7$ are methyl, $R^2$ is butyl, and $R^8$ is a methacryl oxypropyl group.

In a preferred embodiment, the hydrophobic polymeric reactant which forms the hydrophobic polymeric segment of the dispersant is selected from acrylate or methacrylate esters, acrylate or methacrylate oxo esters, acrylate or methacrylate thio esters, amide polymers having a siloxyl substituent (e.g., an oligomeric siloxane grafted to a polyacrylate or polymethacrylate), and mixtures thereof. The hydrophobic polymeric segment has a molecular weight of from about 200 to about 3,000, preferably from about 200 to about 2,000, more preferably from about 800 to about 1,200, most preferably about 900.

The stabilizing segment of the dispersant is believed to help bind the dispersant to the pigment particles as well as to enhance the stabilizing efficacy of the entire polymer. The stabilizing segment is formed from a stabilizing reactant which is preferably selected from either a reactive surfactant, a protective colloid macromer material or a non-siloxyl hydrophobic monomer. The stabilizing segment includes a moiety, preferably an acrylic and/or methacrylic group, which enables it to polymerize into the remainder of the polymer. The stabilizing segment has a molecular weight of from about 200 to about 2,000, preferably from about 200 to about 1,000. Reactive surfactants contain both hydrophobic and hydrophilic moieties and function to affect surface tension and effectively uniformly coat insoluble particles in a dispersion. These materials can have the properties of nonionic or anionic surfactants.

Suitable reactive surfactants for use as stabilizing reactants include nonylphenoxy poly(ethyleneoxy)-acrylate (containing from 1 to about 40 moles of ethylene oxide), nonylphenoxy poly(ethyleneoxy)-methacrylate (containing from 1 to about 40 moles of ethylene oxide), nonylphenoxy poly(propyleneoxy)-acrylate (containing from 1 to about 40 moles of ethylene oxide), nonylphenoxy poly(propyleneoxy)-methacrylate (containing from 1 to about 40 moles of ethylene oxide), nonylphenoxy poly(ethyleneoxy)-crotonate (containing from about 5 to about 40 moles of ethylene oxide), bis-[nonylphenoxy poly(ethyleneoxy)]-fumarate (containing from about 5 to about 40 moles of ethylene oxide), phenoxypoly(ethyleneoxy) acrylate (containing from about 5 to about 40 moles of ethylene oxide), perfluoroheptoxypoly (propyloxy) acrylate, perfluoroheptoxypoly (propyloxy) methacrylate and mixtures thereof.

Protective colloids are reactive polymers derived from cellulose (methyl cellulose, hydroxymethyl cellulose, and/or hydroxyethyl cellulose), polyvinyl alcohols and polyglycols. These products can provide the protective qualities of methyl cellulose, hydroxyethyl cellulose, or polyglycols without the attendant disadvantages of these products, such as water sensitivity and poor compatibility with certain compounding formulations.

Suitable protective colloid materials for use as stabilizing reactants include hydroxyethylcellulose acrylate, hydroxyethylcellulose methacrylate, methoxypoly(ethyleneoxy) acrylate (containing from about 5 to about 40 moles of ethylene oxide), methoxypoly(ethyleneoxy) methacrylate (containing from about 5 to about 40 moles of ethylene oxide), methylcellulose acrylate, methylcellulose methacrylate, methylcellulose crotonate, stearyloxypoly (ethyleneoxy) acrylate (containing from 1 to about 40 moles of ethylene oxide), and stearyloxypoly(ethyleneoxy) methacrylate (containing from about 10 to about 40 moles of ethylene oxide) and mixtures thereof.

Non-siloxyl hydrophobic monomers suitable for use as stabilizing reactants may be derived from long chain aliphatic groups, long chain alcohols, and alkyl aryl alcohols. Examples of such materials include esters, for example acrylates and methacrylates, such as stearyl acrylate, stearyl methacrylate, lauryl acrylate, lauryl methacrylate, nonylphenol acrylate and nonylphenol methacrylate.

Suitable stabilizing segments which may be used in the dispersants of the present invention include stearyl acrylate, stearyl methacrylate, lauryl acrylate, lauryl methacrylate, nonylphenol acrylate, nonylphenol methacrylate, nonylphenoxy poly(ethyleneoxy)$_n$ methacrylate, wherein n is from 1 to about 40, preferably from about 4 to about 15; nonylphenoxy poly(ethyleneoxy)$_n$ acrylate, wherein n is from 1 to about 40, preferably from about 4 to about 15; methoxypoly (ethyleneoxy)$_n$ methacrylate, wherein n is from about 5 to about 40, preferably from about 5 to about 15; methoxypoly (ethyleneoxy)$_n$ acrylate, wherein n is from about 5 to about 40, preferably from about 5 to about 15; stearyloxypoly (ethyleneoxy)$_n$, methacrylate, wherein n is from about 1 to about 20; stearyloxypoly(ethyleneoxy)$_n$ acrylate, wherein n is from about 1 to about 20; perfluoro or highly fluorinated $C_1$–$C_{18}$ alkyl methacrylate; perfluoro or highly fluorinated $C_1$–$C_{18}$ alkyl acrylate (such as trihydroperfluoro undecyl methacrylate and trihydroperfluoroundecyl acrylate); poly (propylene glycol) methyl ether methacrylate; poly (propylene glycol) methyl ether acrylate; poly(propylene glycol) 4-nonylphenol ether methacrylate; poly(propylene glycol) 4-nonylphenol ether acrylate; methacryloxy-trimethylsiloxy-terminated polyethylene oxide, and acryloxy-trimethylsiloxy-terminated polyethylene oxide. Preferred stabilizing segments include stearyl methacrylate, stearyl acrylate, lauryl methacrylate, lauryl acrylate, nonylphenoxy (PEG)$_{4-10}$ acrylate, nonylphenoxy (PEG)$_{4-10}$ methacrylate, trimethylsiloxy-terminated (PEG)$_{2-6}$ methacrylate, nonylphenoxy (PPG)$_{4-6}$ acrylate, nonylphenoxy (PPG)$_{4-6}$ methacrylate, and trihydroperfluoro undecyl methacrylate. Particularly preferred stabilizing segments are stearyl methacrylate, nonylphenoxy (PEG)$_{4-6}$ methacrylate, nonylphenoxy (PPG)$_{4-6}$ methacrylate, nonylphenoxy (PEG)$_{4-6}$ acrylate and nonylphenoxy (PPG)$_{4-6}$ acrylate.

The dispersants of the present invention can be made by free radical polymerization reactions which utilize initiators and chain transfer agents to control the polymer molecular weight. Any conventional free radical initiator may be used in the present invention as long as they are compatible with the reactants being utilized. Suitable free radical initiators include the azo-type and peroxide-type initiators, preferred initiators are the azo-type. Preferred initiators include dimethyl 2,2'-azobisisobutyrate (V-601™), AIBN™ and V-501™ from the Wako Company.

In one embodiment the chain transfer agents employed in forming the dispersants of the present invention are aromatic mercaptans. During the polymerization reaction, it is believed that a bond is formed between the polymeric free radical and the sulfur of the chain transfer agent, providing the polymer with an aromatic group attached by a sulfur link. While not being bound by theory, it is also believed that the addition of the thio-aromatic group to the polymer results in an additional hydrophobic functionality which can adsorb onto the surface of the pigment. Thus, the use of aromatic mercaptans in dispersant synthesis increases both the hydrophobic nature of the resulting polymer and the ability of the polymer to adsorb onto the pigment. In contrast, when alkyl mercaptans are used as chain transfer agents, the resulting polymer often has a less hydrophobic nature and does not adsorb as well onto the pigment. The improved ability of dispersants synthesized with aromatic mercaptans to adsorb onto pigment results in ink which performs well, even when low levels of humectant are used.

The chain transfer agents of the present invention are preferably aromatic mercaptans. Suitable aromatic mercaptans comprise an aromatic ring separated from a thio group by an alkyl or alkoxy group. Preferred aromatic mercaptans comprises an aromatic ring separated from the thio group by an alkyl group comprising at least 1, more preferably at least 2, carbon atoms. In one embodiment the aromatic ring of the mercaptan is separated from the thio group by from about 2 to about 3 carbon atoms.

The aromatic ring may be substituted. Suitable aromatic mercaptans have the structure:

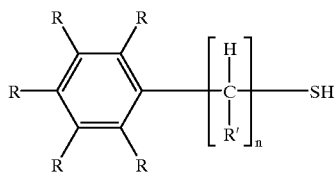

wherein each R is independently a hydrogen, a hydrocarbyl radical, an alkoxyl group or an aromatic group, with the proviso that at least 2 of the R groups are hydrogen; R' is hydrogen, methyl or ethyl, and n is an integer of at least 1, preferably at least 2, more preferably from 2 to 3. Suitable hydrocarbyl radicals for the R groups include alkyls and cycloalkyls such as cyclopentyl or cyclohexyl. Hydrocarbyl radicals may contain any number of carbon atoms, preferably the hydrocarbyl radicals contain from 1 to about 6 carbon atoms.

Suitable aromatic mercaptans include benzyl mercaptan, 2-phenylethyl mercaptan, 2-phenylpropyl mercaptan, 1-methyl-2-o-tolylbutyl mercaptan, 3-ethylbenzyl mercaptan, 4-isopropylbenzyl mercaptan, 1-(2-butylphenyl) ethyl mercaptan, 1-ethyl-2-(4-hexylphenyl)butyl mercaptan, 3-cyclohexylbenzyl mercaptan, 2-(4-cyclopentylphenyl) ethyl mercaptan nonylphenylpolyethyleneglycol mercaptan, and mixtures thereof. Preferred aromatic mercaptans include benzyl mercaptan, nonylphenylpolyethyleneglycol mercaptan, phenylethyl mercaptan, 2-phenylpropyl mercaptan and mixtures thereof.

The dispersants of the present invention generally have a weight average molecular weight (Mw) of at least about 1,000, preferably at least about 2,000 more preferably at least about 2,500, and not greater than about 20,000, preferably not greater than about 10,000, more preferably not greater than about 8,000. A suitable molecular weight range is from about 1,000 to about 20,000, preferably from about 2,000 to about 10,000, more preferably from about 2,500 to about 8,000.

In one embodiment, the hydrophobic polymeric segment has a siloxyl substituent. This segment, also referred to as the "siloxane hydrophobic macromer," is present in an amount in excess of the hydrophilic monomers used to form the hydrophilic polymeric segment. The ratio of moles of hydrophilic monomer used to form the hydrophilic polymeric segment to moles of siloxane hydrophobic macromer in the polymeric dispersant is generally from about 5:1 to about 100:1, preferably from about 7:1 to about 30:1, more preferably from about 8:1 to about 22:1. In one embodiment, the ratio of siloxane hydrophobic macromer to stabilizing segment is from about 1 to about 2 siloxane hydrophobic macromers to from about 1 to about 5 stabilizing segments, or from about 1:1 to about 1:5, preferably from about 1:1 to about 1:3, more preferably about 1:1, siloxane hydrophobic macromer:stabilizing segment. The molar ratio of siloxane hydrophobic macromer to the thio-aromatic group is generally from about 1:1 to about 1:2.

In another embodiment the dispersant has a hydrophilic monomer:hydrophobic polymeric segment:stabilizing segment molar ratio of from about 5:1:1 to about 100:1:10, preferably from about 7:1:1 to about 30:1:5, more preferably from about 8:1:1 to about 22:1:1. In one embodiment the dispersant has a hydrophilic monomer:hydrophobic polymeric segment:stabilizing segment:thio-aromatic group molar ratio of from about 5:1:1:1 to about 100:1:10:2, preferably from about 7:1:1:1 to about 30:1:5:2, more preferably from about 8:1:1:1 to about 22:1:1:1.

Generally the molar ratio of hydrophilic monomer:hydrophobic polymeric reactant:stabilizing reactant:aromatic mercaptan in the dispersant synthesis mixture is from about 5:1:1:1 to about 100:1:10:2, preferably from about 7:1:1:1 to about 30:1:5:2, more preferably from about 8:1:1:1 to about 22:1:1:1.

In one embodiment a preferred polymeric dispersant comprises a thio-aromatic group and the structure:

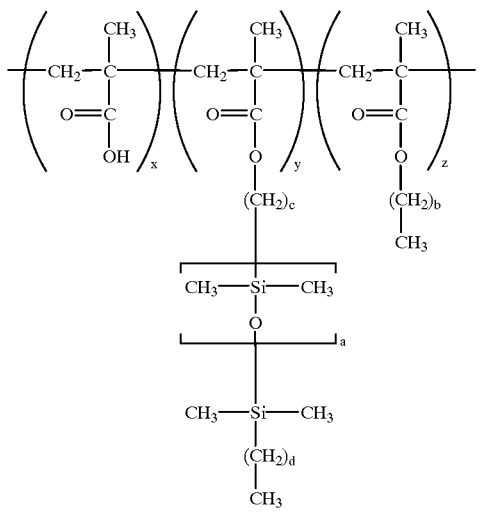

wherein x is from about 5 to about 100, preferably from about 8 to about 22; y is from about 1 to about 2, most preferably about 1; z is from about 1 to about 5, preferably from about 1 to about 2, most preferably about 1; a is from about 1 to about 45, preferably from about 1 to about 24, most preferably about 9; b is from about 3 to about 29, preferably from about 5 to about 17, most preferably from about 15 to about 17; c is from about 2 to about 8, preferably about 3; and d is from 0 to about 7, preferably about 3.

In another embodiment a preferred polymeric dispersant comprises a thio substituent, which is preferably a thio-aromatic group or a thio-alkyl group, and the structure:

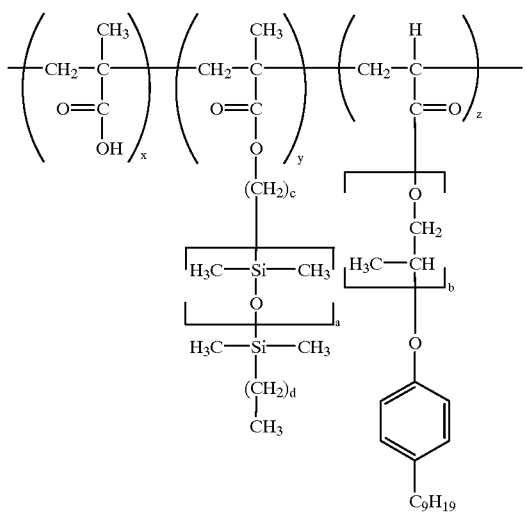
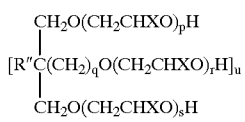

wherein x is from about 5 to about 100, preferably from about 8 to about 22; y is from about 1 to about 2, most preferably about 1; z is from about 1 to about 5, preferably from in about 1 to about 2, most preferably about 1; a is from about 1 to about 45, preferably from about 1 to about 24, most preferably about 9; b is from about 2 to about 30, preferably from about 2 to about 9, preferably from about 3 to about 6, most preferably about 4; c is from about 2 to about 8, preferably about 3; and d is from 0 to about 7, preferably about 3.

Generally, ink compositions comprise from about 0.01% to about 10%, preferably from about 0.25% to about 5%, more preferably from about 0.5% to about 2%, and even more preferably about 0.8%, by weight, polymeric dispersant.

Humectant Mixtures

Preferably the ink composition comprises a humectant mixture. The preferred humectant mixture comprises a bis-hydroxy terminated thioether, a lactam, and a compound selected from the group consisting of polyalkylene glycols, polyol/alkylene oxide condensates and mixtures thereof.

The polyalkylene glycol generally has a molecular weight of from about 200 to about 4,000, preferably from about 200 to about 2,000, more preferably from about 400 to about 1,000, even more preferably from about 600 to about 1,000, and most preferably about 1,000. Suitable polyalkylene glycols include polyethylene glycol, polyproylene glycol and PEG-co-PPG; preferably the polyalkylene glycol is a polyethylene glycol. The polyethylene glycol generally has a molecular weight of from about 200 to about 4,000, preferably from about 200 to about 2,000, more preferably from about 400 to about 1,000, even more preferably from about 600 to about 1,000, and most preferably about 1,000.

Polyol/alkylene oxide condensates are reaction products of a polyol and an alkylene oxide. Suitable alkylene oxides include ethylene oxide, propylene oxide, random and block copolymer chains of propylene and ethylene oxides, and mixtures thereof. Suitable polyols contain at least about 2, preferably at least about 3, hydroxyl groups. Suitable triols include glycerol, trimethylol propane, trimethylol ethane, 1,2,4-butanetriol and 1,2,6-hexanetriol. Suitable tetrols include pentaerythritol, di-(trimethylol propane), and methyl glucosides, while glucose is a suitable pentol. Suitable hexols include sorbitol, dipentaerythritol and inositol. Preferably the polyol/alkylene oxide condensates have a degree of oxyalkylation in the range from about 2 to about 100, more preferably from about 10 to about 40, alkylene oxide units.

Preferred polyol/alkylene oxide condensates have the formula:

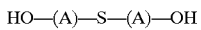

wherein X is H or $CH_3$; R'' is H, $CH_3$, $C_2H_5$, $C_3H_7$, $C_4H_9$, or $—CH_2O (CH_2CH_2O)_t$; q is 0 or 1; p+s+u(r+t) is from about 2 to about 100, and u is from about 1 to about 6. Polyol/alkylene oxide condensates are described in Wickramanayke et al., U.S. Pat. No. 5,302,197, incorporated herein by reference.

Preferably the polyol/alkylene oxide condensates have a solubility in water of at least 4.5% (i.e., 4.5 parts in 100 parts of water) at 25° C. A preferred polyol/alkylene oxide condensate is Liponic EG™.

Suitable bis-hydroxy terminated thioethers have the formula:

HO—(A)—S—(A)—OH wherein each A is independently an aryl group or $(CR_2)_x$, and each R is independently a hydrogen, a $C_{1-6}$ alkyl group, aryl group or a halogen, and x is an integer from about 1 to about 7. Preferred bis-hydroxy terminated thioethers include 2,2'-thiodiethanol and bis-propanol thioether. In a preferred embodiment the ink composition is free of mercaptan compounds having unpleasant odors, such as mercaptoethanol.

As used here, "lactams" is intended to include cyclic amide compounds such as cyclic amides, substituted cyclic amides and cyclic amide derivatives. Suitable lactams include pyrrolidone compounds, valerolactam compounds, caprolactam compounds, imidazolidinone compounds and oxazolidinone compounds. Lactams are described in Wickramanayke et al., U.S. Pat. No. 5,302,197, and Schwarz, Jr., U.S. Pat. No. 5,882,389, both of which are incorporated herein by reference.

In one embodiment the lactam is a cyclic amide compound having the formula:

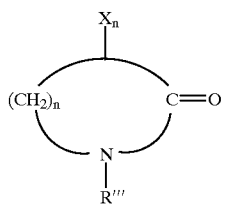

wherein n is from about 3 to about 7, preferably from about 3 to about 5; R''' is hydrogen or an alkyl group having from about 1 to about 4 carbon atoms and optionally containing one or more hydroxy or ether groups; m is from about 0 to about 3; and X is an alkyl group having from about 1 to about 4 carbon atoms and optionally containing one or more hydroxy or ether groups, and wherein when m is other than 0, X replaces a hydrogen on the ring. Preferred cyclic amides have a ring size in the range from about 5 to about 9, more preferably from about 5 to anbout 7, members. Preferably the cyclic amide compound has a solubility in water of at least about 4.5%, by weight, at 25° C.

The cyclic amide compound may be selected from the group consisting of 2-pyrrolidone, 1-methyl-2-pyrrolidone, 1,5-dimethyl-2-pyrrolidone, 1-ethyl-2-pyrrolidone, 1-propyl-2-pyrrolidone, 1-isopropyl-2-pyrrolidone, 1-butyl-2-pyrrolidone, 1-(2-hydroxyethyl)-2-pyrrolidone, 1-methyl-2-piperidone, valerolactam, 1-ethyl valerolactam, caprolactam, 1-methylcaprolactam, oenantholactam, and mixtures thereof. Suitable imidazolidinone compounds include 1,3-dimethyl-2-imidazolidinone.

Suitable oxazolidinone compounds have the formula:

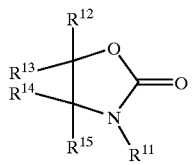

wherein $R^{11}$ is a hydrogen, an alkyl group, or a substituted alkyl group, and $R^{12}$, $R^{13}$, $R^{14}$, and $R^{15}$ are each independently, hydrogen, an alkyl group, a substituted alkyl group, or an alkoxy group.

In one embodiment $R^{11}$ is selected from the group consisting of hydrogen; alkyl groups having from 1 to about 12, preferably from 1 to about 3 carbon atoms; and substituted alkyl groups having from 1 to about 12, preferably from 1 to about 3, carbon atoms. The substituent or substituents on the alkyl group may be selected from hydroxy groups and alkoxy groups. Suitable alkoxy group substituents include those of the general formula:

wherein v is an integer of from 1 to about 4 and w is an integer of from 1 to about 50, preferably from 1 to about 20, more preferably from 1 to about 3. As used herein, "alkyl group" is intended to include cyclic alkyl groups; suitable alkyl groups include methyl, ethyl, propyl, butyl and cyclohexyl.

In one embodiment $R^{12}$, $R^{13}$, $R^{14}$, and $R^{15}$ are each independently selected from the group consisting of hydrogen; alkyl groups having from 1 to about 12, preferably from 1 to about 3 carbon atoms; substituted alkyl group, having from 1 to about 12, preferably from 1 to about 3, carbon atoms; and alkoxy groups having the general formula:

wherein v is an integer of from 1 to about 4 and w is an integer of from 1 to about 50, preferably from 1 to about 20, more preferably from 1 to about 3. The substituent or substituents on the alkyl group may be selected from hydroxy groups and alkoxy groups. Suitable alkoxy group substituents include those of the general formula:

wherein y is an integer of from 1 to about 4 and z is an integer of from 1 to about 50, preferably from 1 to about 20, more preferably from 1 to about 3. As used herein, "alkyl group" is intended to include cyclic alkyl groups; suitable alkyl groups include methyl, ethyl, propyl, butyl and cyclohexyl.

In a preferred embodiment the oxazolidinone compound is selected from the group consisting of oxazolidinone compounds wherein $R^{11}$ is hydrogen, and $R^{12}$, $R^{13}$, $R^{14}$, and $R^{15}$ are each independently hydrogen, an alkyl group, a substituted alkyl group or an alkoxy group, with the proviso that at least one of $R^{12}$, $R^{13}$, $R^{14}$, and $R^{15}$ is not a hydrogen; and oxazolidinone compounds wherein $R^{11}$ is an alkyl group or substituted alkyl group, and $R^{12}$, $R^{13}$, $R^{14}$, and $R^{15}$ are each independently hydrogen, an alkyl group, a substituted alkyl group or an alkoxy group.

The oxazolidinone compound may be selected from the group consisting of: 3-methyl-2-oxazolidinone, 3-ethyl-2-oxazolidinone, 3-butyl-2-oxazolidinone, 3-cyclohexyl-2-oxazolidinone, 3-(hydroxyethyl)-2-oxazolidinone, 4-methyl-2-oxazolidinone, 5-methyl-2-oxazolidinone, 3,5-dimethyl-2-oxazolidinone, 3-ethyl-5-methyl-2-oxazolidinone, 3-butyl-5-methyl-2-oxazolidinone, 3-(2-hydroxypropyl)-5-methyl-2-oxazolidinone, 4-ethyl-2-oxazolidinone, 5-ethyl-2-oxazolidinone, 4,4-dimethyl-2-oxazolidinone, 5,5,3-trimethyl-2-oxazolidinone, 5-methyl-3-ethyl-2-oxazolidinone, 3-(2-hydroxypropyl)-5-methyl-2-oxazolidinone, 5-isopropyl-3-methyl-2-oxazolidinone, 5-ethyl-4-methyl-2-oxazolidinone, 5-methyl-3-(hydroxyethyl)-2-oxazolidinone, 4,5-dimethyl-3-(hydroxyethyl)-2-oxazolidinone, 5,5-dimethyl-3-ethyl-2-oxazolidinone, 3,5-diethyl-5-methyl-2-oxazolidinone, 5-methyl-3-cyclohexyl-2-oxazolidinone, 4,5-dimethyl-3-cyclohexyl-2-oxazolidinone, 3,4,5-trimethyl-2-oxazolidinone, 3-butyl-4-ethyl-5-methyl-2-oxazolidinone, 4-ethyl-2-oxazolidinone, 4,4-diethyl-2-oxazolidinone, 5,5-diethyl-3-methyl-2-oxazolidinone, 3-(hydroxyethoxyethyl)-2-oxazolidinone, or mixtures thereof.

In one preferred embodiment the humectant mixture comprises 2-pyrrolidone, polyethylene glycol having a molecular weight of about 1,000 and 2,2'-thiodiethanol. In one embodiment, the ink composition is free of humectants other than the polyalkylene glycol, polyol/alkylene condensate, bis-hydroxy terminated thioether and lactam, although penetrants may be present.

The ink composition preferably comprises, by weight of the ink composition, from about 1% to about 30%, preferably from about 2% to 15%, more preferably from about 5% to about 7%, and most preferably about 5%, of the polyalkylene glycol; from about 1% to about 30%, preferably from about 2% to about 25%, more from about 5% to about 7%, and most preferably about 5% of the bis-hydroxy terminated thioether; and from about 1% to about 30%, preferably from about 2% to about 25%, more from about 5% to about 7%, and most preferably about 5% of the lactam. In a preferred embodiment, the ink composition comprises, by weight of the ink composition, from about 5% to about 7% of the polyalkylene glycol, about 5% of the bis-hydroxy terminated thioether, and about 5% of the lactam.

Ink Compositions

The ink compositions generally comprise, by weight, from about 0.5% to about 10%, preferably from about 1% to about 7%, more preferably from about 2.5% to about 5%, and most preferably about 4%, colorant, and from about 0.01% to about 10%, preferably from about 0.25% to about 5%, more preferably from about 0.5% to about 2%, even more preferably about 0.8%, polymeric dispersant and/or from about 3% to about 90%, preferably from about 6% to about 65%, more preferably from about 10% to about 20%, even preferably from about 10% to about 17%, total humectant.

Suitable colorants include dyes and pigments, preferably the colorant is a pigment. As used herein, "pigment" refers to an insoluble colorant. Suitable pigments include organic and inorganic pigments. The pigment particles are of a size sufficient to permit free flow of the ink through the ink jet printing device, especially at the ejecting nozzles that usually have a diameter ranging from about 10 microns to 50 microns. The pigment particle size is generally from about 0.05 to about 15, preferably from about 0.05 to about 5 and, more preferably, from about 0.05 to about 1, micron. The pigment is combined with the dispersant to form dispersion particles. The average particle size of the dispersion particle is from about 50 to about 250, preferably from about 80 to about 200, more preferably from about 100 to about 160, nm.

Pigments suitable for use in the present invention include azo pigments, such as azo lakes, insoluble azo pigments, condensed azo pigments and chelate azo pigments, polycyclic pigments, perylene pigments, anthraquinone pigments, quinacridone pigments, dioxazine pigments, thioindigo pigments, isoindolinone pigments, quinophthalone pigments, and dry lakes. Suitable organic pigments include nitro pigments, nitroso pigments, aniline black and daylight fluorescent pigments. Preferred pigments include titanium oxide, iron oxide, carbon black, Pigment Red 122, Pigment Yellow 74, Pigment Yellow 128, Pigment Yellow 138, Pigment Blue 15:3 and Pigment Blue 15:4.

Examples of commercially available pigments which may be used in the present invention include the following: Heliogen® Blue L 6901F (BASF), Heliogen® Blue NBD 7010 (BASF), Heliogen® Blue K 7090 (BASF), Heucophthal® Blue G XBT-583D (Heubach), Irgalite® Rubine 4BL (Ciba-Geigy), Quindo® Magenta (Mobay), Indofast® Brilliant Scarlet (Mobay), Hostaperm® Scarlet GO (Hoechst), Permanent Rubine F6B (Hoechst), Monastral® Scarlet (Ciba-Geigy), Raven® 1170 (Col.Chem.), Raven® 3500 (Col.Chem.), Raven® 5000 (Col.Chem.), Special Black 4A (Degussa), Black FW18 (Degussa),Regal® 250R (Cabot), Sterling® NS Black (Cabot), Sterling® NSX 76 (Cabot), Monarch® 880 (Cabot), Tipure® R-101 (DuPont), Mogul L (Cabot), BK 8200 (Paul Uhlich), Heliogen® Green K 8683 (BASF), Heliogen® Green L 9140 (BASF), Monastral® Red B (Ciba-Geigy), Monastral® Violet R (Ciba-Geigy), Hostaperm® Orange GR (Hoechst), Paliogen® Orange (BASF), L75-2377 Yellow (Sun Chem.), L74-1357 Yellow (Sun Chem.), Hostaperm® Yellow H4G (Hoechst), Irgazin® Yellow 5GT (Ciba-Geigy), Permanent Yellow G3R-01 (Hoechst), Novoperm® Yellow FGL (Hoechst), Chromophthal® Yellow 3G (Ciba-Geigy), Hansa Yellow X (Hoechst), Dalamar® Yellow YT-858-D (Heubach), and Hansa Brilliant Yellow 5GX-02 (Hoechst).

In one embodiment, the ink composition comprises from about 0.5% to about 10%, preferably from about 2% to about 6%, more preferably from about 3% to about 5% by weight, pigment. Optimal pigment to dispersant weight ratios may easily be determined for an ink comprising a pigment and a dispersant. Although the optimal pigment to dispersant weight ratio may vary depending upon the specific pigment and dispersant employed, the weight ratio is generally from about 1:1 to about 6:1, preferably about 2:1 to 5:1, more preferably about 3:1.

The ink compositions generally comprise a carrier, preferably an aqueous carrier. The ink compositions of the present invention are manufactured using any suitable technique. In one embodiment the ink is prepared by mixing the pigment, dispersant and water, preferably deionized water, together in an attritor to form a concentrate. The pigment concentrate is milled until the appropriate particle size is obtained. The concentrate is then diluted with water and additional components, such as humectants and biocide, are added to give the desired ink.

The ink compositions may optionally comprise surfactants to modify the surface tension of the ink and to control the penetration of the ink into the paper. Such surfactants are included in the ink compositions, and are not a component of the dispersant. Suitable surfactants include nonionic, amphoteric and ionic surfactants, preferred surfactants include alkyl sulfate, nonyl phenyl PEG, SILWET®, TERGITOL® and SURFYNOL®. In one embodiment, the ink composition comprises a surfactant which is other than the reactive surfactant used in the synthesis of the dispersant.

Other additives, such as biocides, viscosity modifiers, penetrants, anti-kogation agents, anti-curling agents, chelating agents, anti-bleed agents, and buffers may be added to the ink composition at their art-established levels. Suitable chelating agents include sodium ethylene diamine tetraacetate, sodium nitrilotriacetate, sodium hydroxyethyl ethylene diamine triacetate and sodium diethylene triamine pentaacetate. Suitable biocides include benz-isothiazolin-one, methyl-isothizaolin-one, chloro-methyl-isothiazolin-one, sodium dehydroacetate, sodium sorbate, sodium 2-pyridinethiol-1-oxide, sodium benzoate and sodium pentachlorophenol. Preferred anti-bleed agents include 2-(2-butoxyethoxy)ethanol and hexylcarbitol.

Penetrants aid in the penetration of ink into paper by increasing the wettability of ink. Suitable penetrants include 1,2-alkyl diols having from about 4 to about 6 carbon atoms and straight chain alkanols, preferably 1-hydroxy alkanols having from about 1 to about 5 carbon atoms. Preferred 1,2-alkyl diols penetrants include 1,2-pentanediol and 1,2 hexanediol, while preferred alkanol penetrants include 1-propanol, isopropyl alcohol and neopentyl alcohol.

The composition may comprise the penetrant at a level which is sufficient to decrease dry time of the ink but which does not increase feathering of the ink onto paper fibers. In one embodiment the ink composition comprises from about 0.1% to about 10.0%, preferably from about 0.5% to about 5%, more preferably from about 0.5% to about 3%, by weight, of a penetrant. In one embodiment, the penetrant is selected from the group consisting of 1-propanol, 1,2-hexanediol and mixtures thereof. In a preferred embodiment the composition comprises from about 0.5% to about 1%, by weight, 1,2-hexanediol.

EXAMPLES

Example 1

Ink compositions comprising a humectant mixture in accordance with the present invention demonstrate improved dry time and improved dry smudging. A comparative prior art composition and an inventive composition in accordance with the present invention are formulated as follows:

TABLE 1

Comparative and Example Compositions Formulations

| | Quantity (Weight%) | |
|---|---|---|
| Ingredient | Comparative Composition | Inventive Composition |
| Carbon Black | 4 | 4 |
| Polymeric Dispersant | 0.8 | 0.8 |
| Polyethylene Glycol (MW 1000) | 10 | 5 |
| 2,2'-Thiodiethanol | 10 | 5 |

TABLE 1-continued

Comparative and Example Compositions Formulations

| | Quantity (Weight%) | |
|---|---|---|
| Ingredient | Comparative Composition | Inventive Composition |
| 2-Pyrrolidone | 0 | 5 |
| 1-Propanol | 2 | 2 |
| Proxel ® GXL* | 0.2 | 0.2 |
| Deionized Water | balance | balance |

*Proxel ® GXL is a commercially available biocide from Xeneca Corp.

The comparative composition comprises a total of 20%, by weight, humectant (10% polyethylene glycol and 10% 2,2'-thiodiethanol), while the inventive composition comprises a total of 15%, by weight, humectant (5% polyethylene glycol, 5% 2,2'-thiodiethanol and 5% 2-pyrrolidone).

Comparison of the ink in accordance with the present invention to the comparative ink composition is set forth below.

TABLE 2

Comparison of Printing Attributes

| Printing Attribute | Comparative Composition | Inventive Composition |
|---|---|---|
| Optical density | 1.38 | 1.33 |
| Dry time (seconds) | 24 | 18 |
| Dry smudging 10 minutes after printing | 3 | 1 |
| Dry smudging 24 hours after printing | 2.5 | 1 |

The data set forth in Table 2 represent means of 13 different printing tests. Optical density indicates the darkness of the black; the higher the optical density, the richer the black color on the printed paper. Dry time refers to the number of seconds it takes for the printed image to be dry to the touch. Dry smudging is measured by a visual scale of from 1 through 4, 1 indicating no smearing of image upon rubbing, and 4 indicating there is substantial smudging.

As indicated by Table 2 above, the comparative composition and the inventive composition give comparable degrees of darkness. However, the ink composition according to the present invention not only has decreased dry times as compared to prior art composition, it also exhibits no smudging upon rubbing 10 minutes after printing. In contrast, the comparative ink composition exhibits smudging even 24 hours after printing. Thus, ink compositions in accordance with the present invention have improved dry time, exhibit improved dry smudging, and require less total humectant while maintaining good uncapped start-up and idling maintenance.

Example 2

A stock solution of a dispersant in accordance with the present invention is synthesized as follows: 56.1 grams of methacrylic acid; 31 grams of methacryloyl terminated polydimethylsiloxane having a molecular weight of about 900; 12.3 grams of stearyl methacrylate; 4.98 grams of phenylethyl mercaptan; 180 mls of isopropyl alcohol; and 0.82 of dimethyl 2,2'-azobisisobutyrate (V-601™ from Wako Co.) is placed in a 500 ml, 3-neck round bottom flask which is equipped with a mechanical stirrer, a condenser and a thermometer. The ingredients are mixed together and degassed, and the flask is backfilled with nitrogen.

The flask is immersed in an oil bath heated to about 75° C. for about 18 hours. A viscous solution is formed. The solution is dried in an explosion-proof oven and the molecular weight is determined by gel permeation chromatography. The weight average molecular weight is about 4825, while the number average molecular weight is about 2608. The dried powder is dissolved in deionized water and the pH is adjusted to 7.5 with 20% KOH. The resulting dispersant stock solution is mixed with pigment in a mechanical stirrer until there are no visible lumps. The mixture is then dispersed by an attrition process using an attritor. The pigment to dispersant weight ratio is about 5:1. The attrition process is typically performed for a minimum of one hour, however, longer times at controlled temperatures can also be used. A dispersion comprising dispersant and pigment and having a dispersion particle size in the range of from about 100 nm to about 120 nm is obtained. The dispersion maintains its particle size for 60 days.

Example 3

An ink composition may be prepared by mixing the concentrated premixed dispersion with deionized water, polyethylene glycol, 2,2-thiodiethanol, 2-pyrrolidone, and, optionally, 1-propanol and a biocide such as Proxel® GXL from Xeneca Corp. The final pH of the ink is adjusted to about 8.0 by the addition of 20% KOH. The ink is filtered through a series of filters with the final filter being 1.2 microns.

Example 4

An ink composition may be prepared by mixing the concentrated premixed dispersion with deionized water, polyethylene glycol, 2,2-thiodiethanol, 2-pyrrolidone, 1,2-hexanediol and a biocide. The ink composition is set forth in Table 3 below:

TABLE 3

Ink Composition

| Ingredient | Weight % |
|---|---|
| Carbon Black | 4 |
| Polymeric Dispersant | 0.8 |
| Polyethylene Glycol (MW 1000) | 5 |
| 2,2'-Thiodiethanol | 5 |
| 2-Pyrrolidone | 5 |
| 1,2-Hexanediol | 0.5 |
| Biocide | 0.2 |
| Deionized Water | balance |

Additional embodiments and modifications within the scope of the claimed invention will be apparent to one of ordinary skill in the art. Accordingly the scope of the present invention shall be considered in terms of the following claims, and understood not to be limited to the details of the methods described in this specification.

What is claimed is:

1. An ink composition, comprising a colorant and an additive selected from the group consisting of:
   (a) dispersants synthesized from an aromatic mercaptan, a hydrophilic monomer, a hydrophobic polymeric reactant having a siloxyl substituent, and a stabilizing reactant, wherein the molar ratio of hydrophilic monomer:hydrophobic polymeric reactant:stabilizing reactant:aromatic mercaptan is from about 5:1:1:1 to about 100:1:10:2;
   (b) humectant mixtures comprising a bis-hydroxy terminated thioether, a lactam, and a compound selected from the group consisting of polyalkylene glycols, polyol/alkylene oxide condensates and mixtures thereof; wherein the ink composition comprises from about 6% to about 65%, by weight, total humectant, from about 2% to about 25%, by weight, bis-hydroxy terminated thioether and from about 2% to about 25%, by weight, lactam; and (c) mixtures thereof.

2. An ink composition according to claim 1, wherein the humectant mixture comprises a polyalkylene glycol having a molecular weight of from about 200 to about 2,000; and further wherein the lactam is selected from the group consisting of 2-pyrrolidone, 1-methyl-2-pyrrolidone, 1,5-dimethyl-2-pyrrolidone, 1-ethyl-2-pyrrolidone, 1-propyl-2-pyrrolidone, 1-isopropyl-2-pyrrolidone, 1-butyl-2-pyrrolidone, 1-(2-hydroxyethyl)-2-pyrrolidone, 1-methyl-2-piperidone, valerolactam, 1-ethyl valerolactam, caprolactam, 1-methylcaprolactam, oenantholactam, 1,3-dimethyl-2-imidazolidinone, oxazolidinone compounds and mixtures thereof; and the bis-hydroxy terminated thioether has the formula:

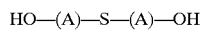

HO—(A)—S—(A)—OH wherein each A is independently an aryl group or $(CR_2)_x$, and each R is independently a hydrogen, $C_{1-6}$ alkyl group, aryl group or halogen, and x is an integer from about 1 to about 7.

3. An ink composition according to claim 2, wherein the polyalkylene glycol is a polyethylene glycol having a molecular weight of about 1,000; the lactam is 2-pyrrolidone; and the bis-hydroxy terminated thioether is 2,2'-thiodiethanol.

4. An ink composition according to claim 1, wherein the aromatic mercaptan has the structure:

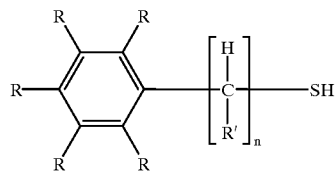

wherein each R is hydrogen, a hydrocarbyl radical, an alkoxyl group or an aromatic group, with the proviso that at least 2 of the R groups are hydrogen; R' is hydrogen, methyl or ethyl, and n is an integer of at least 1.

5. An ink composition according to claim 1, wherein the aromatic mercaptan is selected from the group consisting of benzyl mercaptan, 2-phenylethyl mercaptan, 2-phenylpropyl mercaptan, 1-methyl-2-o-tolylbutyl mercaptan, 3-ethylbenzyl mercaptan, 4-isopropylbenzyl mercaptan, 1-(2-butylphenyl)ethyl mercaptan, 1-ethyl-2-(4-hexylphenyl)butyl mercaptan, 3-cyclohexylbenzyl mercaptan, 2-(4-cyclopentylphenyl)ethyl mercaptan nonylphenylpolyethyleneglycol mercaptan and mixtures thereof.

6. An ink composition according to claim 1, wherein the humectant mixture comprises a polyol/alkylene oxide condensate having the formula:

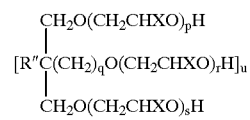

wherein X is H or $CH_3$; R" is H, $CH_3$, $C_2H_5$, $C_3H_7$, $C_4H_9$, or $—CH_2O(CH_2CH_2O)_t$; q is 0 or 1; p+s+u(r+t) is from about 2 to about 100, and u is from about 1 to about 6.

7. An ink composition according to claim 1, wherein the stabilizing reactant is selected from the group consisting of reactive surfactant macromers, protective colloid groups, non-siloxyl containing hydrophobic monomers and mixtures thereof.

8. An ink composition according to claim 1, wherein the hydrophilic monomer comprises an ingredient selected from the group consisting of acrylic acid, methacrylic acid and mixtures thereof; and the hydrophobic polymeric reactant is selected from the group consisting of methacryloyl terminated polydimethylsiloxane, acryloyl terminated polydimethylsiloxane and mixtures thereof; and the stabilizing reactant is selected from the group consisting of methacrylates, acrylates and mixtures thereof.

9. An ink composition according to claim 8, wherein the hydrophilic monomer comprises methacrylic acid, the hydrophobic polymeric reactant is methacryloyl terminated polydimethylsiloxane and the first stabilizing reactant is selected from the group consisting of stearyl methacrylate, nonyl phenoxy $(PEG)_{4-6}$ methacrylate, nonyl phenoxy $(PPG)_{4-6}$ methacrylate and mixtures thereof.

10. An ink composition according to claim 1, wherein the colorant is a pigment.

11. An ink composition according to claim 10, wherein the weight ratio of pigment to dispersant is from about 1:1 to about 6:1.

12. An ink composition, according to claim 1, comprising pigment and a humectant mixture; wherein the humectant mixture comprises, by weight of the humectant mixture, from about 25% to about 35% bis-hydroxy terminated thioether, from about 25% to about 35% lactam, and from about 30% to about 45% of a compound selected from the group consisting of polyalkylene glycols, polyol/alkylene oxide condensates and mixtures thereof.

13. An ink composition according to claim 1, wherein the humectant mixture comprises a polyol/alkylene oxide condensate; 2,2'-thiodiethanol; and 2-pyrrolidone.

14. An ink composition according to claim 1, comprising:
 a pigment; and
 a dispersant synthesized from an aromatic mercaptan, methacrylic acid, methacryloyl terminated polydimethylsiloxane and stearyl methacrylate.

15. An ink composition, according to claim 1, wherein the colorant is a pigment and wherein the composition comprises the dispersant synthesized from an aromatic mercaptan, a hydrophilic monomer, a hydrophobic polymeric reactant having a siloxyl substituent, and a stabilizing reactant, and wherein the dispersant exhibits an improved ability to adsorb onto pigments as compared to a dispersant synthesized from a non-aromatic mercaptan, the hydrophilic monomer, the hydrophobic polymeric reactant having a siloxyl substituent, and the stabilizing reactant.

16. An ink composition according to claim 1, comprising the humectant mixture; wherein the lactam is selected from the group consisting of oxazolidinone compounds and mixtures thereof.

17. An ink composition according to claim 16, comprising a oxazolidinone compound having the formula:

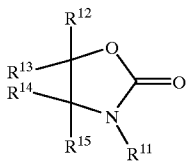

wherein $R^{11}$ is a hydrogen, an alkyl group, or an alkyl group comprising moieties selected from the group consisting of hydroxy group, alkoxy groups, and mixtures thereof; and $R^{12}$, $R^{13}$, $R^{14}$, and $R^{15}$ are each independently, hydrogen, an alkyl group, an alkyl group comprising moieties selected from the group consisting of hydroxy group, alkoxy groups, and mixtures thereof or an alkoxy group.

18. An ink composition according to claim 1, further comprising a dispersant synthesized from a non-aromatic mercaptan, the hydrophilic monomer, the hydrophobic polymeric reactant having a siloxyl substituent, and a stabilizing reactant selected from the group consisting of nonylphenoxy $(PEG)_{4-6}$ methacrylate, nonylphenoxy $(PPG)_{4-6}$ methacrylate, nonylphenoxy $(PEG)_{4-6}$ acrylate, nonylphenoxy $(PPG)_{4-6}$ acrylate and mixtures thereof.

19. An ink composition, comprising a pigment and an additive selected from the group consisting of:
(a) dispersants comprising a hydrophilic polymeric segment, a hydrophobic polymeric segment, a thio-aromatic group and a stabilizing segment wherein the dispersant has a hydrophilic monomer:hydrophobic polymeric segment:stabilizing segment:thio-aromatic group molar ratio of from about 5:1:1:1 to about 100:1:10:2;
(b) humectant mixtures comprising from about 25% to about 35%, by weight of the humectant mixture, of a bis-hydroxy terminated thioether, from about 25% to about 35%, by weight of the humectant mixture, of a lactam, and from about 30% to about 45%, by weight of the humectant mixture, of a compound selected from the group consisting of polyalkylene glycols, polyol/alkylene oxide condensates and mixtures thereof; and
(c) mixtures thereof.

20. An ink composition according to claim 19, wherein the humectant mixture comprises a polyalkylene glycol having a molecular weight of from about 200 to about 1,000.

21. An ink composition according to claim 19, wherein the humectant mixture comprises a polyol/alkylene oxide condensate having the formula:

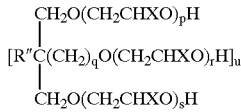

wherein X is H or $CH_3$; R" is H, $CH_3$, $C_2H_5$, $C_3H_7$, $C_4H_9$, or $—CH_2O(CH_2CH_2O)_r$; q is 0 or 1; p+s+u(r+t) is from about 2 to about 100, and u is from about 1 to about 6.

22. An ink composition according to claim 19, wherein the thio-aromatic group comprises an aromatic ring separated from a sulfur atom by a moiety selected from the group consisting of alkyl groups, alkoxy groups and mixtures thereof.

23. An ink composition according to claim 19, wherein the hydrophobic polymeric segment has a siloxyl substituent and a number average molecular weight of from about 200 to about 3000, and further wherein the first stabilizing segment has a number average molecular weight of from about 200 to about 2,000 and is selected from the group consisting of reactive surfactant macromers, protective colloid macromers and non-siloxyl hydrophobic monomers.

24. An ink composition according to claim 19, comprising about 0.8%, by weight, of dispersant.

25. An ink composition according to claim 19, comprising, by weight, about 5% bis-hydroxy terminated thioether, about 5% lactam and from about 5% to about 7% of the compound selected from the group consisting of polyalkylene glycols, polyol/alkylene oxide condensates and mixtures thereof.

26. An ink composition according to claim 19, comprising, by weight:
about 4% pigment;
about 0.8% of dispersant
about 5% to about 7% of the compound selected from the group consisting of polyalkylene glycols, polyol/alkylene oxide condensates and mixtures thereof; and
about 5% of the bis-hydroxy terminated thioether; and
about 5% of the lactam.

27. An ink composition according to claim 26, comprising a polyalkylene glycol having a molecular weight of from about 400 to about 1,000; wherein the bis-hydroxy terminated thioether is selected from the group consisting of 2,2'-thiodiethanol, bis-propanol thioether and mixtures thereof, and the lactam is selected from the group consisting of pyrrolidone compounds, valerolactam compounds, caprolactam compounds, imidazolidinone compounds, oxazolidinone compounds and mixtures thereof.

28. An ink composition according to claim 26, further comprising from about 0.1% to about 10.0% of a penetrant comprising a straight chain 1-hydroxy alkanol having from about 1 to about 5 carbon atoms.

29. An ink composition according to claim 19, further comprising a dispersant comprising the hydrophilic polymeric segment, the hydrophobic polymeric segment, a thio-alkyl group and a second stabilizing segment selected from the group consisting of nonylphenoxy $(PEG)_{4-6}$ methacrylate, nonylphenoxy $(PPG)_{4-6}$ methacrylate, nonylphenoxy $(PEG)_{4-6}$ acrylate, nonylphenoxy $(PPG)_{4-6}$ acrylate and mixtures thereof.

30. A method of forming an ink, comprising
synthesizing a dispersant from an aromatic mercaptan, hydrophilic monomer, hydrophobic polymeric reactant and stabilizing reactant, wherein the molar ratio of hydrophilic monomer:hydrophobic polymeric reactant:stabilizing reactant:aromatic mercaptan is from about 5:1:1:1 to about 100:1:10:2;
combining the dispersant with pigment to form dispersion particles; and
mixing the dispersion particles and a humectant mixture comprising a bis-hydroxy terminated thioether, a lactam, and a compound selected from the group consisting of polyalkylene glycols, polyol/alkylene oxide condensates and mixtures thereof.

31. A method according to claim 30, wherein the humectant mixture comprises a a polyethylene glycol having a molecular weight of from about 200 to about 1,000.

32. A method according to claim 30, wherein the average particle size of the dispersion particles is from about 100 nm to about 120 nm.

33. A method according to claim 30, wherein the aromatic mercaptan comprises an aromatic ring separated from the thio group by an alkyl group comprising at least 2 carbon atoms.

34. A method according to claim 30, wherein the humectant mixture comprises a polyol/alkylene oxide condensate.

35. A method according to claim 30, wherein the molar ratio of hydrophilic monomer:hydrophobic polymeric reactant:stabilizing reactant:aromatic mercaptan is from about 7:1:1:1 to about 30:1:5:2; and further wherein the humectant mixture comprises, by weight of the humectant mixture, from about 25% to about 35% bis-hydroxy terminated thioether, from about 25% to about 35% lactam, and from about 30% to about 45% of a compound selected from the group consisting of polyalkylene glycols, polyol/alkylene oxide condensates and mixtures thereof.

36. A method according to claim 30, wherein the lactam is selected from the group consisting of oxazolidinone compounds and mixtures thereof.

37. A method of reducing smudging of pigment-based ink compositions, comprising formulating the ink composition with a dispersant and a humectant mixture, wherein the dispersant is selected from the group consisting of:
dispersants synthesized from an aromatic mercaptan, a hydrophilic monomer, a hydrophobic polymeric reactant having a siloxyl substituent, and a first stabilizing reactant;
mixtures thereof; and further wherein the humectant mixture comprises a bis-hydroxy terminated thioether, a lactam, and a compound selected from the group consisting of polyalkylene glycols, polyol/alkylene oxide condensates and mixtures thereof.

38. A method according to claim 37, wherein the hydrophobic polymeric reactant has a siloxyl substituent.

39. A method according to claim 38, wherein the first dispersant is synthesized from an aromatic mercaptan, methacrylic acid, methacryloyl terminated polydimethylsiloxane and stearyl methacrylate; the humectant mixture comprises a polyalkylene glycol having a molecular weight of from about 200 to about 2,000; the bis-hydroxy terminated thioether is selected from the group consisting of 2,2'-thiodiethanol, bis-propanol thioether and mixtures thereof; and the lactam is selected from the group consisting of pyrrolidone compounds, valerolactam compounds, caprolactam compounds, imidazolidinone compounds, oxazolidinone compounds and mixtures thereof.

40. A method according to claim 37, wherein the wherein the molar ratio of hydrophilic monomer:hydrophobic polymeric reactant:stabilizing reactant:aromatic mercaptan is from about 5:1:1:1 to about 100:1:10:2; and further wherein the humectant mixture comprises, by weight of the humectant mixture, from about 25% to about 35% bis-hydroxy terminated thioether, from about 25% to about 35% lactam, and from about 30% to about 45% of a compound selected from the group consisting of polyalkylene glycols, polyol/alkylene oxide condensates and mixtures thereof.

41. A method of decreasing dry time of pigment-based ink compositions, comprising formulating the ink composition with a dispersant and a humectant mixture;
wherein the dispersant comprises a thio-aromatic group and a moiety selected from the group consisting of nonylphenoxy (PEG)$_{4-6}$ methacrylate, nonylphenoxy (PPG)$_{4-6}$ methacrylate, nonylphenoxy (PEG)$_{4-6}$ acrylate, nonylphenoxy (PPG)$_{4-6}$ acrylate and mixtures thereof; and
the humectant mixture comprises a bis-hydroxy terminated thioether, a lactam, and a compound selected from the group consisting of polyalkylene glycols, polyol/alkylene oxide condensates and mixtures thereof.

42. A method according to claim 41, wherein the humectant mixture comprises a polyalkylene glycol.

43. A method according to claim 41, wherein the wherein the humectant mixture comprises a polyol/alkylene oxide condensate.

44. A method according to claim 41, wherein the lactam is selected from the group consisting of pyrrolidone compounds, valerolactam compounds, caprolactam compounds, imidazolidinone compounds, oxazolidinone compounds and mixtures thereof.

45. A copolymer comprising:
(a) a hydrophilic polymeric segment, incorporating a carboxyl substituent;
(b) a hydrophilic polymeric segment, having a molecular weight of from about 200 to 3,000, and incorporating a hydrolytically stable siloxyl substituent;
(c) a stabilizing segment selected from the group consisting of nonylphenoxy (PEG)$_{4-6}$ methacrylate, nonylphenoxy (PPG)$_{4-6}$ methacrylate, nonylphenoxy (PEG)$_{4-6}$ arcylate, nonylphenoxy (PPG)$_{4-6}$ acrylate and mixtures thereof
(d) an aromatic group provided by an aromatic mercaptan;
wherein the copolymer exhibits an improved ability to adsorb onto pigments as compared to a copolymer comprising the hydrophilic polymeric segment, the hydrophobic polymeric segment, the stabilizing segment and a non-aromatic group provided by a non-aromatic mercaptan.

46. A copolymer according to claim 45, having a molecular wieght in the range of from about 1,000 to about 20,000.

47. A copolymer according to claim 45, having the structure:

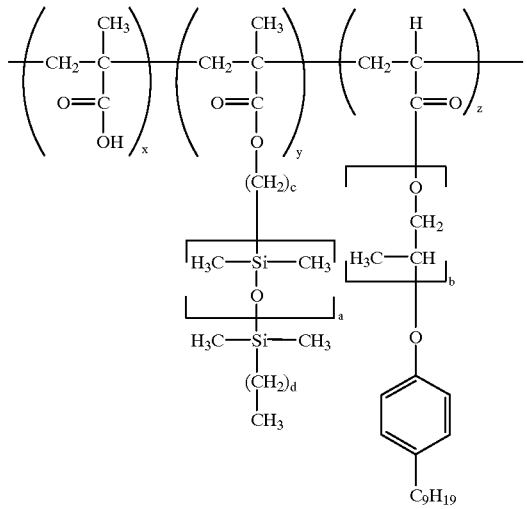

wherein x is from about 5 to about 100; y is from about 1 to about 2; z is from about 1 to about 5; a is from about 1 to about 45; b is from about 2 to about 30; c is from about 2 to about 8; and d is from 0 to about 7.

48. A copolymer according to claim 47, wherein x is from about 8 to about 22; y is about 1; z is about 1; a is about 9; b is from about 2 to about 9; c is about 3; and d is about 3.

49. A method of improving the ability of a dispersant to adsorb onto pigments in an ink composition, comprising the step of replacing a non-aromatic chain transfer agent used in the synthesis of the dispersant with an aromatic mercaptan, wherein the dispersant is selected from the group consisting of dispersants comprising a thio-aromatic group, a hydrophilic polymeric segment, a hydrophobic polymeric segment having a siloxyl substituent and a stabilizing segment.

50. A method according to claim 49, wherein the aromatic mercaptan has the structure:

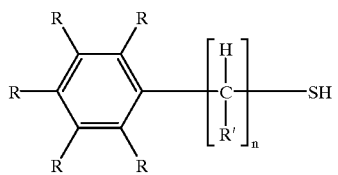

wherein each R is hydrogen, a hydrocarbyl radical, an alkoxyl group or an aromatic group, with the proviso that at least 2 of the R groups are hydrogen; R' is hydrogen, methyl or ethyl, and n is an integer of at least 1.

* * * * *